United States Patent [19]

Katz

[11] Patent Number: 5,375,748

[45] Date of Patent: Dec. 27, 1994

[54] BICYCLE FRAME CARRIER SUPPORT SYSTEM

[76] Inventor: Robert D. Katz, 1648 C Sherbrooke St. West, Montreal, Quebec, Canada, H3H 1C9

[21] Appl. No.: 977,912

[22] Filed: Nov. 18, 1992

[51] Int. Cl.⁵ .................................................. B62J 9/00
[52] U.S. Cl. ........................................ 224/41; 224/36; 224/31
[58] Field of Search ............... 224/30 A, 31, 32 R, 224/36, 39, 41

[56] References Cited

U.S. PATENT DOCUMENTS

| | | |
|---|---|---|
| 2,010,479 | 8/1935 | Dennis . |
| 2,209,846 | 7/1940 | Pawsat . |
| 2,439,376 | 4/1948 | Aleks . |
| 2,457,624 | 12/1948 | Aleks . |
| 2,498,446 | 2/1950 | Pawsat . |
| 2,576,111 | 11/1951 | Glenny et al. . |
| 2,700,493 | 1/1955 | Meier, Jr. ................... 224/36 |
| 3,945,544 | 3/1976 | Walker et al. ............. 224/32 R |
| 4,066,196 | 1/1978 | Jackson et al. ............... 224/31 |
| 4,798,318 | 1/1989 | Irwin . |

FOREIGN PATENT DOCUMENTS

| | | | |
|---|---|---|---|
| 541655 | 10/1955 | Norway ........................ 224/30 A |
| 24828 | 11/1907 | United Kingdom ................. 224/36 |

*Primary Examiner*—Linda J. Sholl
*Attorney, Agent, or Firm*—Chilton, Alix & Van Kirk

[57] ABSTRACT

The carrier has two spaced clips attached to a rear wall thereof. Each clip includes a downwardly extending tapered finger. The system includes two receiving elements, centrally mounted on the handle bar, each receiving element receiving a respective one of the downwardly extending fingers. A bar spaces the receiving elements on the handle bar such that the spacing between the receiving elements corresponds with the spacing between the downwardly extending fingers. The receiving elements are removably affixed at either end of the bar.

8 Claims, 9 Drawing Sheets

BICYCLE FRAME CARRIER SUPPORT SYSTEM

BACKGROUND OF THE INVENTION

1. Field of the Invention

The invention relates to a support system for mounting a carrier on the frame of a bicycle, and more specifically, the handle bars of the bicycle. The invention also relates to the support system and the carrier mounted by the support system.

2. Description of Prior Art

Known in the art are various systems for supporting steel wire, wooden weave, or canvas carriers on the handle bars of a bicycle. Examples of such systems are illustrated in U.S. Pat. No. 2,010,479, Dennis, Aug. 6, 1935, U.S. Pat. No. 2,439,376, Aleks, Apr. 13, 1948, U.S. Pat. No. 2,498,446, Pawsat, Feb. 21, 1950, U.S. Pat. No. 2,457,624, Aleks, Dec. 28, 1948, U.S. Pat. No. 2,209,846, Pawsat, Jul. 30, 1940, U.S. Pat. No. 2,576,111, Glenny et al, Nov. 27, 1951 and U.S. Pat. No. 4,798,318, Irwin, Jan. 17, 1989. In all of the patented systems, the systems include clamp means mounted on the handle bars. In all of the patents except the Irwin patent, the carriers are attached to the clamp means either by brackets or by screw and bolt arrangements. In the Irwin patent, clamp means 12 are included as part of the bracket 10. The bracket engages with an attachment sleeve 18 which is mounted on the back wall of the frame 16 of a bag.

SUMMARY OF INVENTION

It is an object of the invention to provide a novel support system for mounting a carrier on the frame of a bicycle.

It is a more specific object of the invention to provide such a system for mounting the carrier on the handle bars of the bicycle.

It is a further object of the invention to provide such a support system which includes clamp means and a variable length space bar which receives said clamp means at either end thereof whereby to removably affix the clamp means at either end of the spacing bar to provide predetermined lengths of variable spacing of the clamp means as required.

It is a still further object of the invention to provide a support system for mounting a carrier which carrier includes downwardly extending fingers on one wall thereof, said support system including receiving elements for receiving said downwardly extending fingers to support said carrier.

In accordance with the invention there is provided a support system for mounting a carrier on the frame of a bicycle, said carrier having two spaced clips attached to a rear wall thereof, each clip comprising a downwardly extending finger, said system comprising:

two receiving elements adapted to be centrally mounted on said handle bar, each receiving element being adapted to receive a respective one of said downwardly extending fingers;

bar means for spacing said receiving elements on said handle bar such that the spacing between said receiving elements corresponds with the spacing between said downwardly extending fingers, said receiving elements being removably affixed at either end of said bar means.

Also in accordance with the invention there is provided a carrier arrangement comprising a basket and a cover overlying said basket, said cover being pivotably removable from said basket about hinge means and along a parting line separating said cover and said basket, said carrier including a strap means for carrying said carrier, and means for water tightedly stowing said strap means in said carrier;

means for mounting each end of said strap at either side of said basket below said parting line;

said means for mounting comprising a D-ring at each end of said strap and a retaining means for retaining said D-ring, said retaining means being disposed, on both sides of said basket, below said parting line; and a canopy disposed on both sides of said cover above said retaining means and overhanging said parting line.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
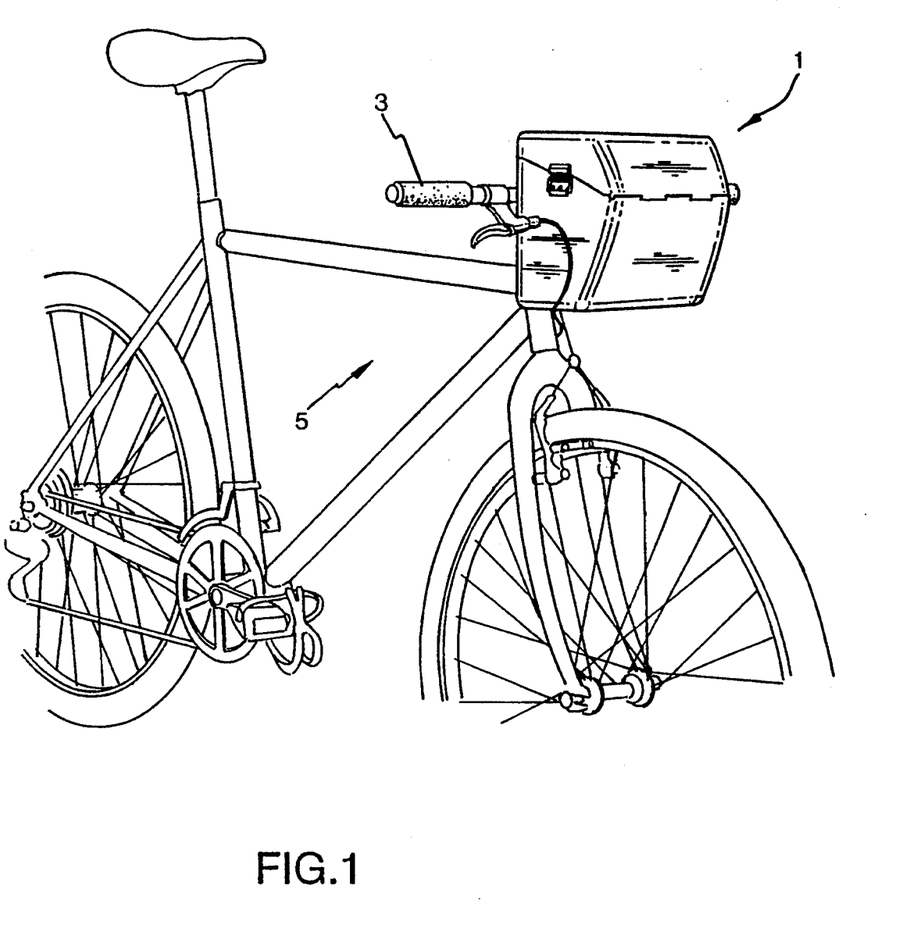
FIG. 1 is a perspective view of a bicycle having a carrier mounted on the handle bars.

Referring to FIG. 1, there is illustrated a carrier, illustrated generally at 1, centrally mounted on the handle bars 3 of a bicycle 5.

Although the carrier 2 is shown mounted on the handle bars 3, it is nevertheless, in accordance with the invention, possible to mount the carrier 1 on other parts of the bicycle frame of bicycles as presently designed or as bicycles may be designed in the future.

Figure 2:
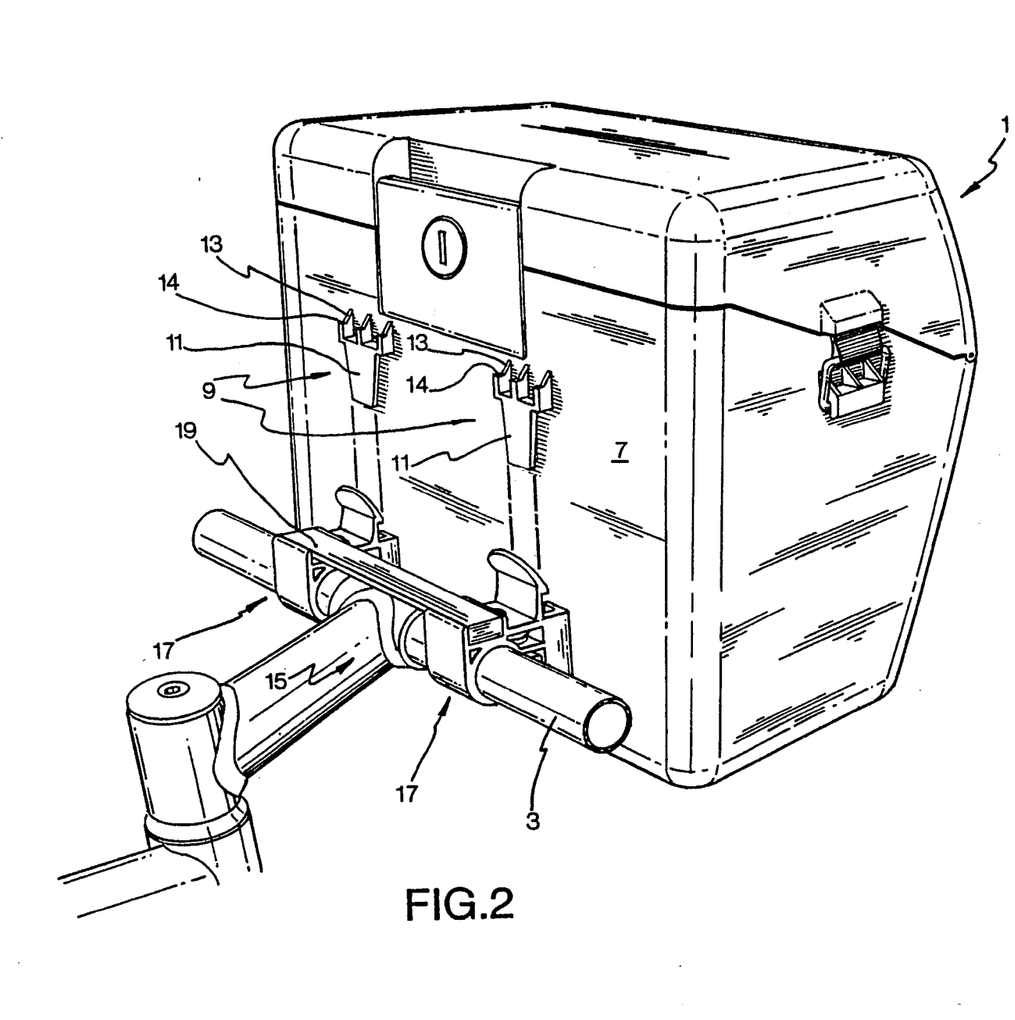
FIG. 2 is a more detailed perspective view of the carrier and the mounting system.
Figure 2A:
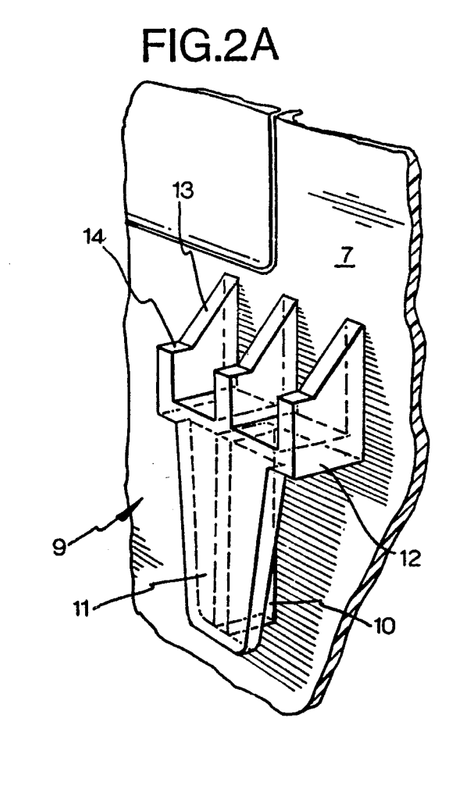
FIG. 2A shows, in expanded form, a detail of FIG. 2.

Referring to FIG. 2, it can be seen that the carrier 1 has a rear wall 7 which includes two spaced clips 9 having downwardly extending fingers 11. Each finger 11 is connected to wall 7 by central web 10 (see FIG. 2A) and by top wall 12. As better seen in FIG. 10, the downwardly extending fingers 11, which taper inwardly in the downward direction, are spaced from the rear wall 7. Ribs 13, having floors 14, (better seen in FIG. 2A) are included at the top ends of the fingers 11 for purposes to be described below.

As also seen, centrally mounted on the handle bar 3 is a support system 15. The support system includes clamping means 17 which, as will be seen below, includes means for receiving the downwardly extending fingers 11. The clamping means 17 are spaced apart by a spacing bar 19.

Figure 3:
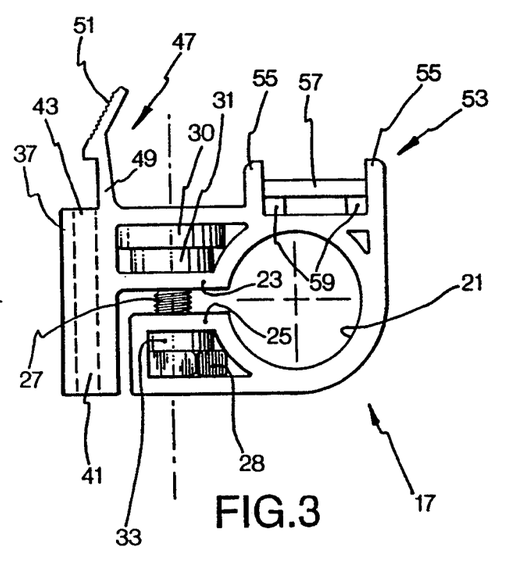
FIG. 3 is a side elevation of a clamping element of the mounting system.
Figure 4:
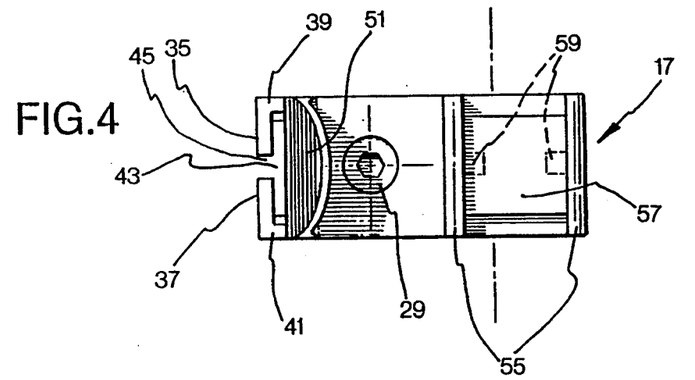
FIG. 4 is a top elevation of FIG. 3.
Figure 5:
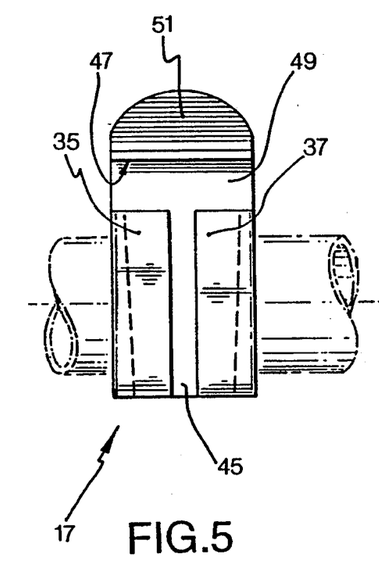
FIG. 5 is a front elevation of FIG. 3.

Referring now to FIGS. 3, 4 and 5, it can be seen that each clamping means 17 includes a circular clamp element 21 having top and bottom arms 23 and 25 respectively extending therefrom. The diameter of the circular clamp is, as well known, reduced by bringing the arms 23 and 25 closer to each other. A screw 27, having a head 29, which head is received in plastic cap 30, extends through the arms 23 and 25 into a bolt which is received in plastic cap 28. The spacings of the arms 23 and 25 are adjusted, as well known in the art, by turning the screw.

As also seen, spacer 31 is included between the head 29 and the top arm 23 while spacer 33 is included between the bottom arm 25 and the bolt 28.

At the front end of each clamping means there are included front walls 35 and 37 and side walls 39 and 41 to define an opening 43, which also tapers inwardly in the downward direction, for receiving a downwardly extending tapered finger 11. A slot 45 extends between the walls 35 and 37 to receive web 10, and the underside of wall 12 sits on the top of walls 35 and 37. A snap member 47, including a support leg 49 and a thumb engagement portion 51, is provided to fix into position a downwardly extending finger of the carrier as will be described below.

Over each circular clamp element 21 is a bar receiving portion, illustrated generally at 53, and including spaced rails 55 joined by a bridge 57. Engagement members 59 underlie the bridge 57.

Figure 6:
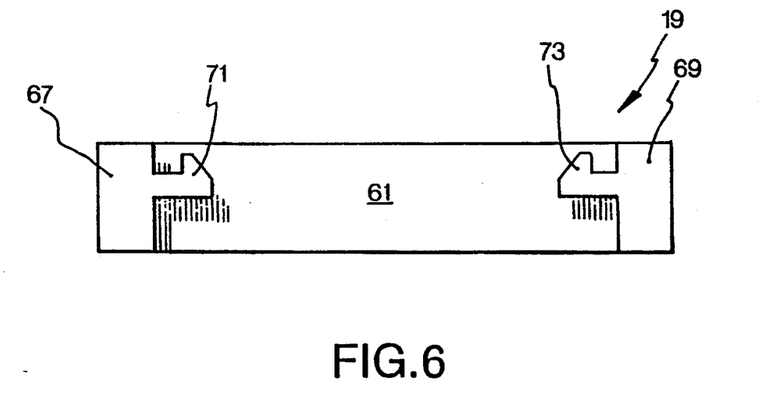
FIG. 6 is a bottom elevation of a spacing bar for spacing the clamping elements from each other.
Figure 7:
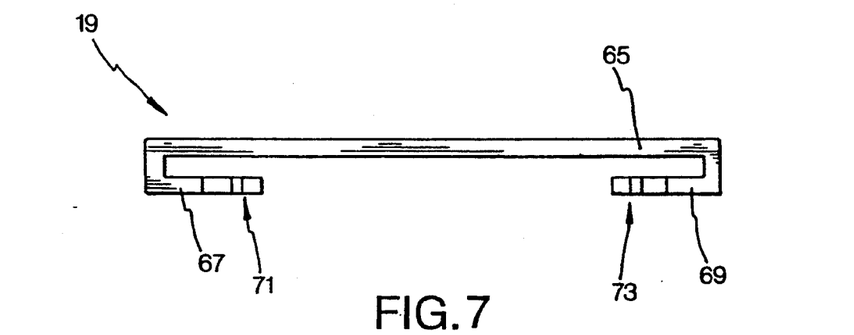
FIG. 7 is a side elevation of FIG. 7.
Figure 8:
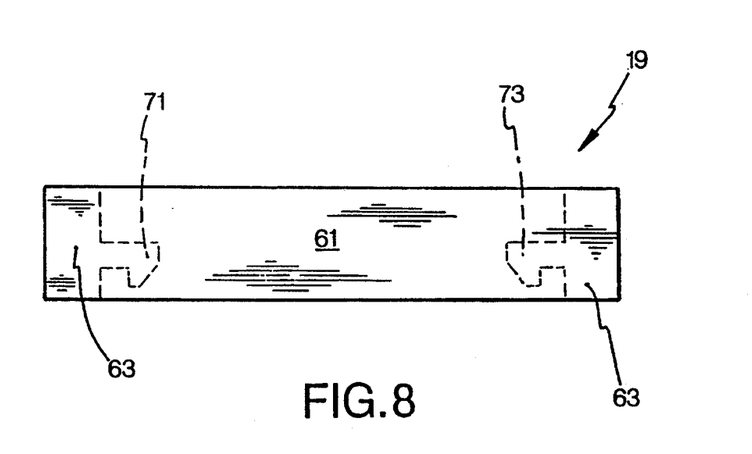
FIG. 8 is a top elevation of the spacing bar.

Turning now to FIGS. 6, 7, and 8, the bar member 19 includes a central portion 61 and ends 63. The center portion 61 and the ends 63 form a top wall 65. Legs 67 and 69 underlie the portions 63 at each end of the bar 19. The legs 67 and 69 are terminated by snap in members 71 and 73 which extend from the free ends of legs 67 and 69.

Figure 9:
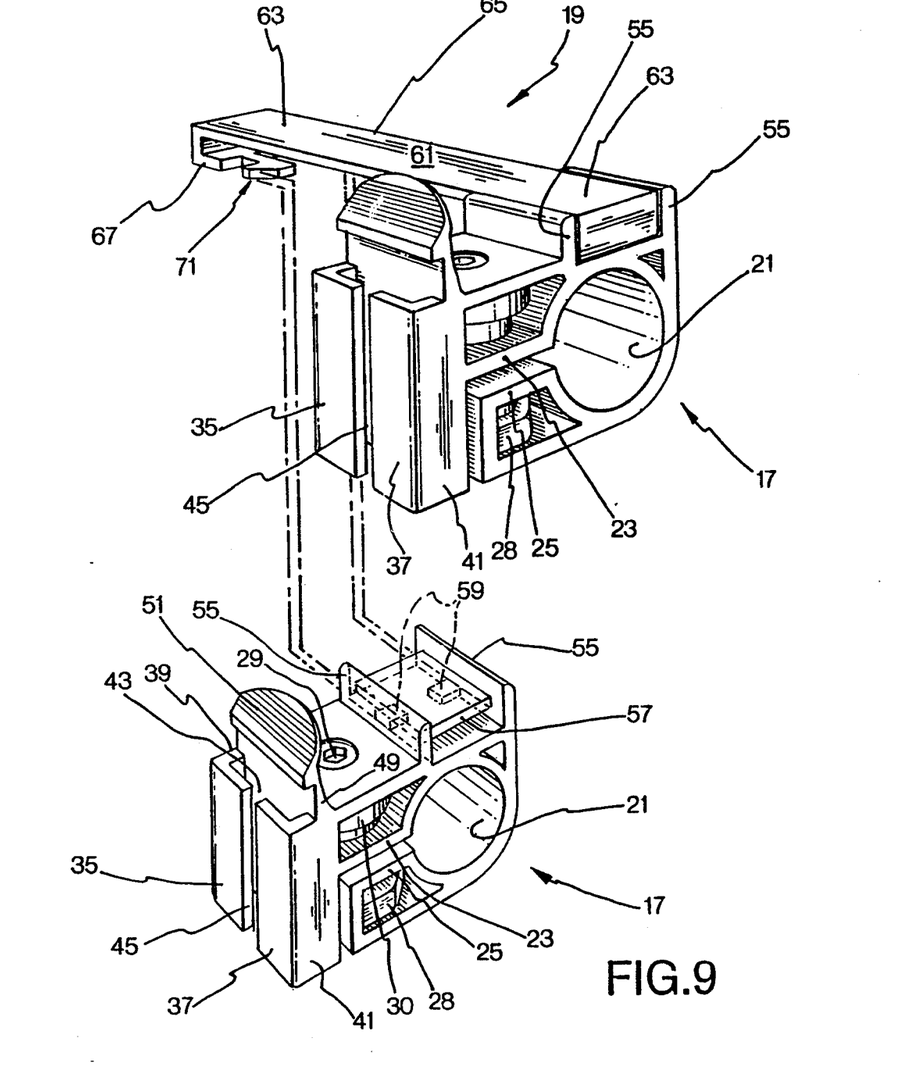
FIG. 9 is a perspective view of the clamping elements and the spacing bar showing how the clamping elements are fixed to the spacing bar.

As seen in FIG. 9, the ends 63 of the bar member 19 fit between a respective pair of rails 55 of the bar receiving portion 53 of each clamping means 17. The legs 67 and 69 fit under respective ones of the bridges 59, and the snap in members 71 and 73 engage respective ones of the engagement members 59 and are snapped into position so that the bar member is removably fixed, at either end thereof, to a respective clamping means.

In operation, the clamping means 17 are joined by bar 19 and the joined clamping means are mounted on the handle bar as shown in FIG. 2 by separating arms 25 from arms 23 and slipping the clamp elements 21 over the handle bar until the clamp elements encircle the handle bar. In this regard, the diameter of the circular clamp elements 21 could be too large for the handle bar even with the adjustment permissible by the screw 29. In such a case, circular spacer inserts would be provided to fit between the handle bar and the inner wall of the circular clamp elements 21.

It is noted that the distance between the clamping means, as fixed by the bar member 19, is set so that the receiving openings 43 of the clamping means will be spaced to receive the downwardly extending fingers 11. The spacing can be varied by lengthening or shortening the bar to accommodate downwardly receiving fingers which are spaced closer or further apart.

Figure 10:
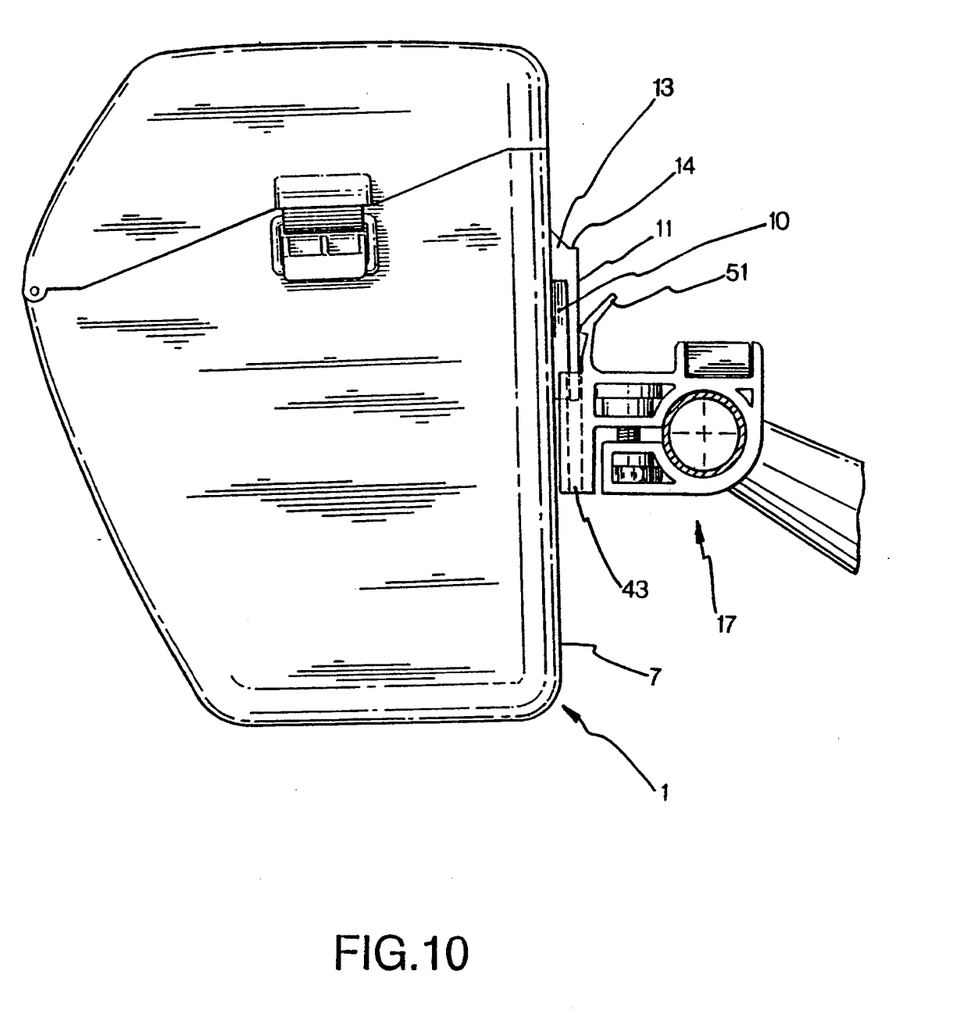
FIG. 10 illustrates how the downwardly extending fingers of the carrier are received in the opening 43 of the clamping element at the start of the mounting procedure.
Figure 11:
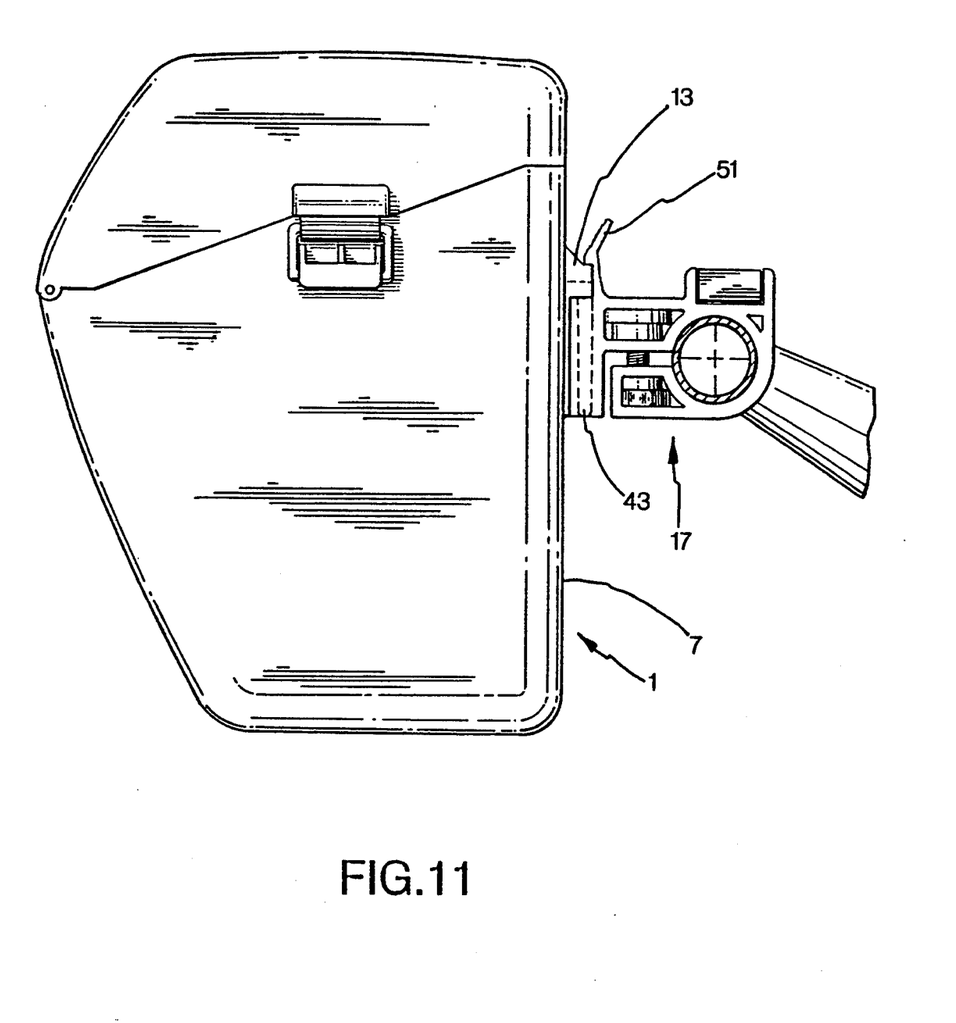
FIG. 11 is a view similar to FIG. 11 at the end of the mounting procedure.

The downwardly extending fingers 11 are then inserted into respective openings 43 to thereby mount the carrier 1 on the handle bars 3 of the bicycle. FIG. 10 illustrates the relationship of the downwardly extending fingers 11 with the opening 43 at the beginning of the mounting process. FIG. 11 illustrates this relationship at the end of the mounting process. As can be seen in FIG. 11, the bottom end of finger engagement 51 portion lies on floors 14 of ribs 13.

Figure 12:
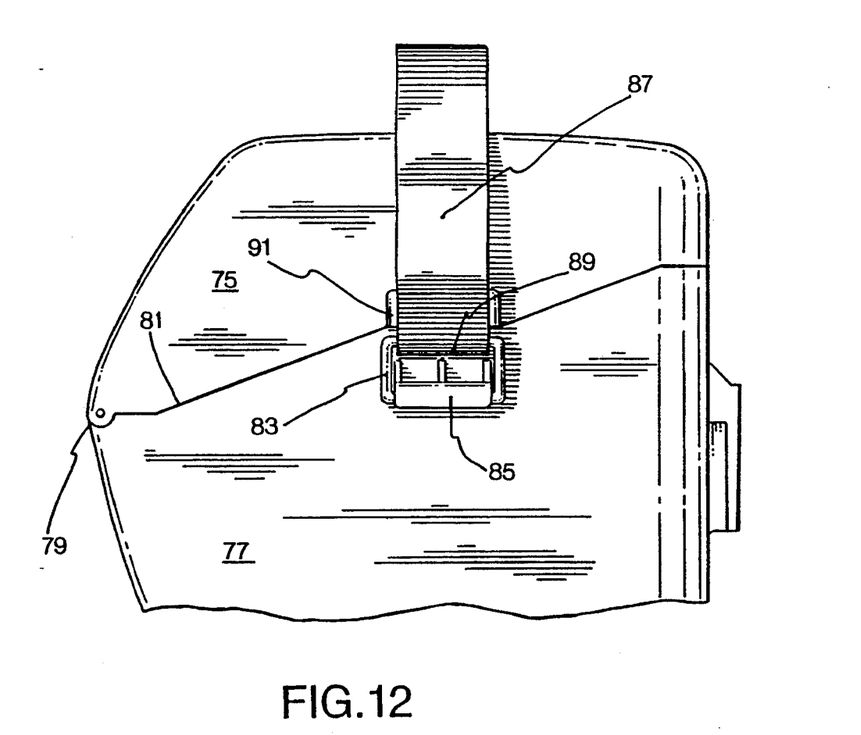
FIG. 12 illustrates a carrying strap for the carrier with the carrying strap being in the carrying position.
Figure 13:
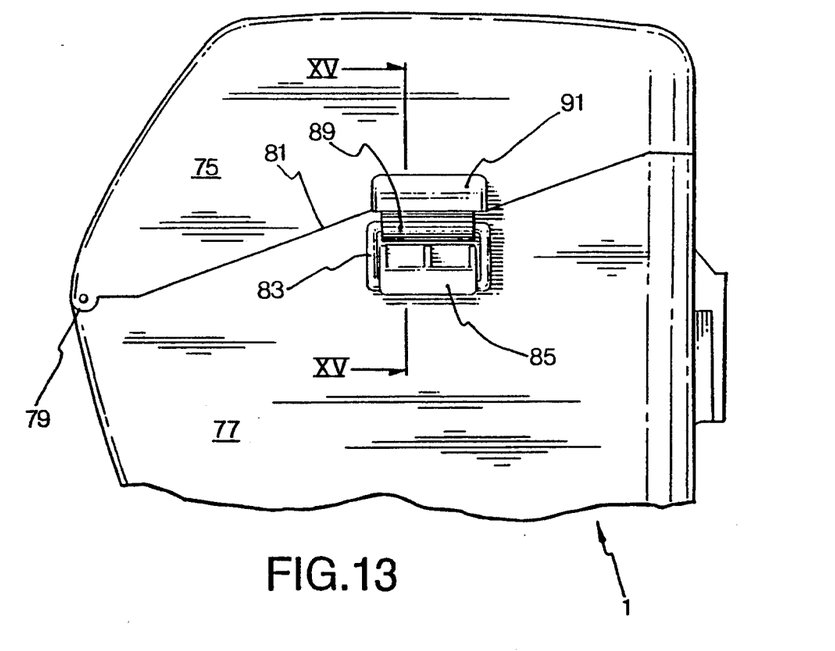
FIG. 13 illustrates the carrier strap in the stowed position.
Figure 14:
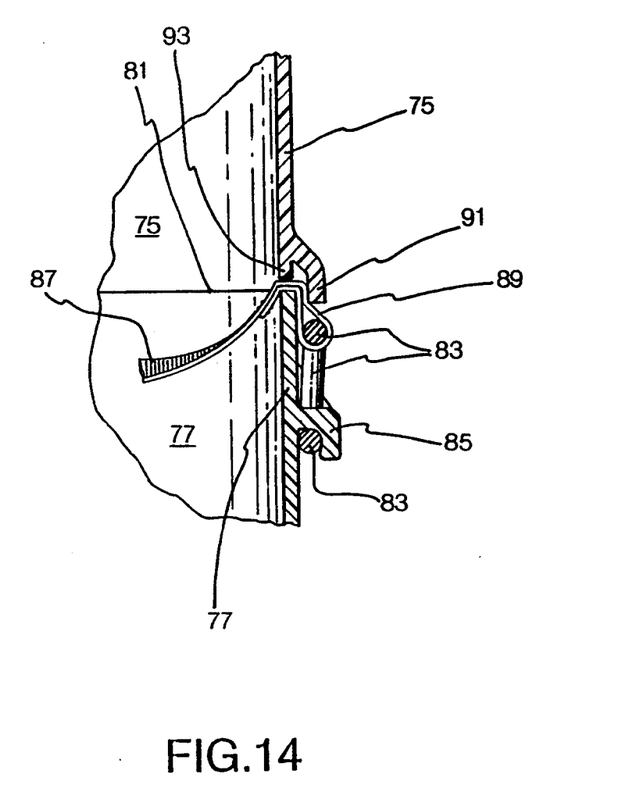
FIG. 14 illustrates the details for mounting the carrying strap and for providing a leak-proof stowing arrangement.

It is also contemplated, in accordance with the invention, to provide a carrying strap for the carrier member as well as an arrangement for water resistant stowing of the carrier strap in the carrier. This is illustrated in FIGS. 12, 13 and 14. Referring to these figures, it can be seen that the carrier 1 comprises a cover 75 and a basket 77. The cover can be lifted away from the basket by pivoting the cover 75 about hinge 79 along a parting line 81.

A ring 83 is removably fixed to the basket 77 by retaining member 85. The strap comprises a webbing 87 attached to the ring 83 by a loop 89.

The webbing 87 will extend also to the other side of the carrier which will also include a ring, and a retainer to which the other side of the strap 87 will also be attached by a loop.

A canopy 91 overlies the parting line 81 as also seen in FIG. 14, and compressive lip 93 is a continuation of the wall of cover 75.

In FIG. 12, the strap is shown in a position to be used for carrying the carrier 1 on, for example, the shoulder of a person carrying the carrier. Alternatively, the webbing 87 could be used as a handle for carrying the carrier.

When the carrier 1 is mounted on the handle bars, it is preferable if the webbing 87 of the strap is stowed in the carrier. For this purpose, the webbing would be moved out of the way of cover 75 and the cover 75 would be pivoted about the hinge 79 to open the carrier. The webbing would then be stowed on the inside of the carrier so that only the loop 89 would extend from the outside to the inside of the carrier as illustrated in FIG. 13. Because the canopy overlies that area of the parting line which receives the webbing, it will prevent water, for example from rain or the like, from entering into the carrier even when the strap is stowed within the carrier as illustrated in FIG. 13.

Compressive lip 93 presses against the web 87 when the strap is stowed to prevent the strap from coming loose. If the strap is dispensed with, the opening along the parting line is limited by the lip 93 to help keep rain water out of the carrier.

Although several embodiments have been described, this was for the purpose of illustrating, but not limiting, the invention. Various modifications, which will come readily to the mind of one skilled in the art, are within the scope of the invention as defined in the appended claims.

I claim:

1. A support system for mounting a carrier on a bicycle, the bicycle having a frame and a handlebar coupled to the frame, the carrier having two spaced clips attached to a rear wall thereof, each clip comprising a downwardly extending finger, said support system comprising:

two receiving elements adapted to be centrally mounted on the handlebar, each of said receiving elements being adapted to receive a respective one of said downwardly extending fingers, said receiving elements each including:

clamping means mountable on the handlebar, said clamping means comprising a circular clamp element for engaging the handlebar;

means for tightening said clamp element to fixedly attach the clamping means to the handlebar;

rail means defining a connection for receiving an end of a bar means, said rail means including a pair of spaced rails; and bar means for spacing said receiving elements on the handlebar such that the spacing between said receiving elements corresponds with the spacing between said downwardly extending fingers, said bar means having a pair of opposite ends, said receiving elements being removably affixed to respective of said opposite ends of said bar means, said bar means including:

a top wall, said top wall having an elongated central portion and two ends;

a leg at each end of said top wall, said legs underlying and being spaced from said top wall; and snap members extending from the free ends of each said leg.

2. A system as defined in claim 1 and including a bridge disposed between said rails;

wherein, when assembled, a respective leg underlies a respective bridge.

3. A system as defined in claim 2 wherein said rail means include engagement members underlying said bridge;

said snap members engaging the engagement members to removably affix said bar means to a respective one of said clamping means.

4. A system as defined in claim 3 wherein said clamping means each further comprises two spaced arms extending from said clamp element; and wherein said means for tightening comprises:
screw means extending through said spaced arms;
whereby to adjust the diameter of said clamp elements.

5. A system as defined in claim 2 wherein said clamping means each further comprises two spaced arms extending from said clamp element; and wherein said means for tightening comprises:
screw means extending through said spaced arms;
whereby to adjust the diameter of said clamp elements.

6. A system as defined in claim 1 and including engagement members underlying said bridge;

said snap members engaging the engagement members so that they are removably fixed to a respective one of the clamping means.

7. A system as defined in claim 6 wherein said clamping means each further comprises two spaced arms extending from said clamp element; and wherein said means for tightening comprises:
screw means extending through said spaced arms;
whereby to adjust the diameter of said clamp elements.

8. A system as defined in claim 1 wherein each said clamp element has two spaced arms extending therefrom;
screw means extending through said spaced arms;
whereby to adjust the diameter of said clamp elements.

* * * * *